(12) United States Patent  (10) Patent No.: US 6,970,106 B2
Vial  (45) Date of Patent: Nov. 29, 2005

(54) DEVICE FOR AIDING THE VISUAL SPOTTING OF AN AIRCRAFT IN FLIGHT FROM ANOTHER AIRCRAFT, ALSO IN FLIGHT

(75) Inventor: Jean-Sébastien Vial, Colomiers (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/439,172

(22) Filed: May 16, 2003

(65) Prior Publication Data

US 2003/0222794 A1 Dec. 4, 2003

(30) Foreign Application Priority Data

Jun. 3, 2002 (FR) .................................. 02 06784

(51) Int. Cl.[7] .............................................. G08G 5/04
(52) U.S. Cl. ...................... 340/961; 340/971; 340/973; 340/980
(58) Field of Search ............................... 340/945, 961, 340/980, 968, 971, 973; 342/175, 176, 182, 342/29, 30, 36; 701/200, 300, 301

(56) References Cited

U.S. PATENT DOCUMENTS 5,138,555 A * 8/1992 Albrecht ...................... 701/14
6,177,888 B1 * 1/2001 Cabot et al. ................. 340/968
6,348,877 B1 * 2/2002 Berstis et al. ................ 340/980
6,657,578 B2 * 12/2003 Stayton et al. ................. 342/30
6,683,562 B2 * 1/2004 Stayton et al. ............... 342/182
6,744,396 B2 * 6/2004 Stone et al. ................... 342/36

FOREIGN PATENT DOCUMENTS

EP 0405430 1/1991

OTHER PUBLICATIONS

Preliminary Search Report dated Feb. 19, 2003.

* cited by examiner

Primary Examiner—Van T. Trieu
(74) Attorney, Agent, or Firm—Stevens, Davis, Miller & Mosher, LLP

(57) ABSTRACT

A device for aiding the visual spotting of a second aircraft in flight by the pilot of a first aircraft looking at the sky through the canopy may include an approximately vertical display device and a first device that displays on the display device a representation of the canopy. A communication device receives position information relating to the second aircraft from an outside source. Using the received position information, a second device displays on the display device a symbol representative of the second aircraft such that the position of the symbol in relation to the displayed representation of the canopy corresponds to the position of the second aircraft in relation to the aircraft's canopy as seen through the pilot's field of view.

5 Claims, 1 Drawing Sheet

DEVICE FOR AIDING THE VISUAL SPOTTING OF AN AIRCRAFT IN FLIGHT FROM ANOTHER AIRCRAFT, ALSO IN FLIGHT

CROSS-REFERENCE TO RELATED APPLICATIONS

This application claims the benefit of a foreign application, FRANCE 02 06784, 3 Jun. 2002.

FIELD OF THE INVENTION

The subject of the present invention is a device for aiding the visual spotting of an aircraft in flight—hereinafter designated the "sought aircraft"—by the pilot of another aircraft scanning, also in flight, the sky through the canopy of the cockpit of this other aircraft—hereinafter designated the "seeker aircraft".

BACKGROUND OF THE RELATED ART

It is known that, during the phases of approach to an airport (initial, intermediate and final approaches and landing), an air traffic controller sometimes asks the pilot of a first aircraft—the seeker aircraft—whether he can see a second aircraft—the sought aircraft—in his field of view. If so, he may then ask him to fly visually by following this sought aircraft without overtaking it. Thus, the seeker aircraft clings on as it were to the sought aircraft in such a way that the air traffic controller then need no longer concern himself with this seeker aircraft. By decreasing the workload of the air traffic controller, such a procedure, termed "visual separation", makes it possible to increase the number of aircraft that the controller can handle simultaneously and consequently to increase the volume of air traffic. Similarly, in the en-route phase, an air traffic controller may ask the pilot of an aircraft to "visually cling" to another aircraft. The controller can thus form a group of several aircraft that he can then handle as a single entity.

This type of procedure nevertheless has a drawback relating to the seeker aircraft pilot's difficulty in locating the position of the sought aircraft in his field of view without any risk of error. Specifically, multiple causes may impede this pilot in locating this sought aircraft. He may be impeded by meteorological phenomena, such as dazzle by the sun, presence of clouds, etc. and also be confronted with a risk of confusion if several aircraft are present in his field of view, in particular if they are close together according to the pilot's viewing angle.

It will be noted that the American document U.S. Pat. No. 6,348,877 describes a system for aiding the visual spotting of a sought aircraft by the pilot of a seeker aircraft, this system displaying on the canopy of the latter aircraft a symbol in alignment with said sought aircraft. However, it is quite obvious that this system cannot remedy the meteorological phenomena and the risk of confusion which were mentioned above.

Moreover, it is known that, on modern civil transport airplanes, the pilot has a display, commonly called the ND (Navigation Display) display on which the neighboring traffic can be represented according to various possible modes, based on information computed by its TCAS (Traffic Collision Avoidance System) system, or transmitted by air traffic control or by the other airplanes. However, these various modes of display generally correspond to a "plan view" cartographic representation of said traffic, i.e. in a plane substantially orthogonal to the plane of the field of view of said pilot through the canopy. They therefore do not allow the pilot to ascertain directly, in a realistic manner, the position of an aircraft in his natural field of view. Consequently, this type of display does not directly solve the existing problem, that is to say consisting in showing the pilot the location of an aircraft in his field of view. When, exceptionally, as described in the document EP-0 405 430, said ND display is disposed in a similar manner to the canopy so as to avoid the drawbacks of a "plan view" cartographic representation, the whole of the neighboring air traffic is displayed on said display, so that the pilot of the seeker aircraft may be confronted with the risk of confusion alluded to hereinabove.

SUMMARY OF THE INVENTION

Consequently, the object of the present invention is to remedy this drawback by allowing the pilot of an aircraft to locate and to identify, easily and dependably, another aircraft flying within his visible domain.

To this end, according to the invention, the device for aiding the visual spotting of an aircraft in flight, called the sought aircraft, by the pilot of another aircraft scanning the sky through the canopy of the cockpit of this other aircraft, called the seeker aircraft, said device being disposed on board said cockpit of the seeker aircraft and comprising:

an at least approximately vertical display device;

means of communication with the outside allowing said seeker aircraft to receive position information relating to said sought aircraft; and means receiving said position information and able to display on said display device a symbol, which is representative of said sought aircraft, is noteworthy in that it comprises means for displaying on said display device a representation of said canopy of said seeker aircraft and in that the position of said symbol superimposed on said representation of the canopy corresponds to that occupied by said sought aircraft in the field of view of said pilot, through said canopy of said seeker aircraft.

Thus, the device in accordance with the present invention indicates, on its display device, the position of another neighboring aircraft, such as it appears in the field of view of the pilot, through the canopy of the cockpit. The pilot can therefore, by comparing between what he sees through the canopy and the image displayed by the display device, easily and dependably locate the sought aircraft designated to him by the air traffic control installation. The device according to the present invention is therefore particularly adapted to the grouped flight of several aircraft in the en-route phases (end of climb, cruising, start of descent) or to the visual tracking of another aircraft by the pilot of an aircraft during an airport approach phase.

Preferably, said means displaying a representation of the canopy comprise a first memory storing information representing the fixed elements of the cockpit of the seeker aircraft which are present in the field of view of the pilot, said means displaying said symbol representative of the sought aircraft comprise a second memory in which are stored said position information and said means displaying a representation of the canopy and said means displaying said symbol comprise, in common, a computing unit combining the information from said first and second memories so as to display said information on said display device.

In order to ease the work of the pilot, it is advantageous that a horizontal axis and a vertical axis, whose intersection is representative of the position of said seeker aircraft on said display device, appear on said display device, in addition to the representation of said canopy and said symbol of the sought aircraft.

In an advantageous embodiment, said means of communication make it possible to link said seeker aircraft, not only to an air traffic control installation, but also to said sought aircraft. Thus, the device according to the invention can receive position information from the other aircraft sought by two different sources.

Preferably, said means of communication are able to transmit a message from said pilot of the seeker aircraft to said air traffic control installation. Thus, this pilot can confirm to the latter that he has indeed identified the aircraft that he was asked to track.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
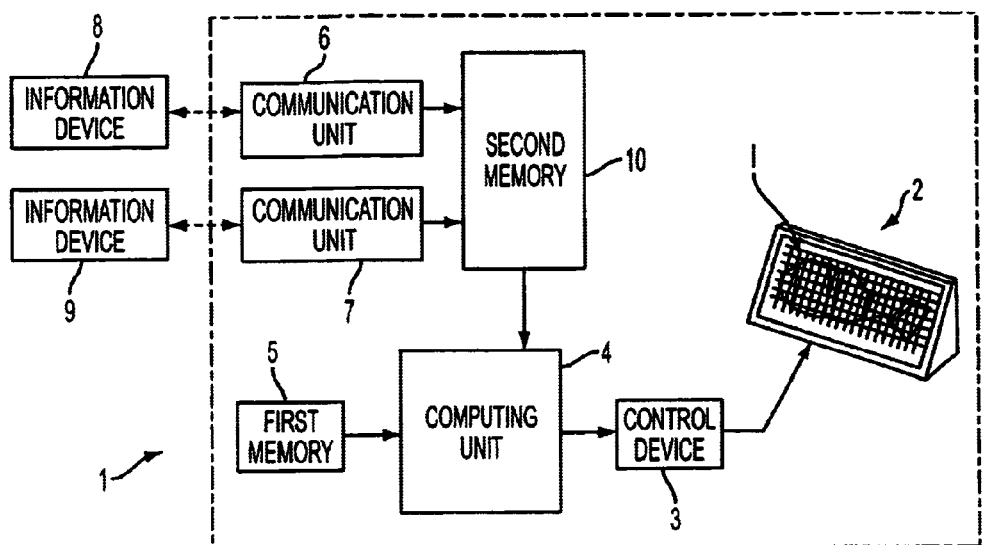
FIG. 1 is the schematic diagram of an exemplary embodiment of the device in accordance with the present invention.

The exemplary embodiment 1 of the device, in accordance with the present invention and represented diagrammatically in FIG. 1, is disposed on board a seeker aircraft (not represented) and it comprises a display 2, substantially vertical or slightly inclined to the vertical, disposed in front of the pilot (not represented) of said seeker aircraft. The displaying of images on said display 2 is controlled by a control device 3, linked to the output of a computing unit 4.

This computing unit 4 is linked with a first memory 5, in which are stored information regarding the representation of the fixed elements of the cockpit of the seeker aircraft which are present in the field of view of the pilot, such as glass panes of the canopy, surrounds of said panes, certain navigation instruments, certain display screens, etc.

Moreover, the device 1 comprises means of communication 6, 7 allowing it to communicate with devices 8, 9 outside said seeker aircraft which are able to supply it with information regarding the other aircraft flying within the neighborhood and visible to said pilot of said seeker aircraft. Such information is, for example, the position, the heading, the attitude, the speed, the type of aircraft, the identification of said aircraft, etc. This information is addressed, by said means of communication 6, 7, to a second memory 10 and stored away in the latter in such a way that, at each instant, the content of this memory 10 is representative of the situation of said neighboring aircraft, flying within the neighborhood of the seeker aircraft on board which the device 1 is mounted. The second memory 10, just like the first memory 5, is linked with the computing unit 4.

Thus, said computing unit 4:
reads the content of the memory 10 cyclically and, from the information of this content, computes the positions of said neighboring aircraft lying in the field of view of the pilot; and
reads the content of the memory 5 and combines them with said computed positions of said neighboring aircraft, so as to compute image information representative of the positions of said neighboring aircraft in the field of view of the pilot, at each instant.

The computing unit 4 addresses said image information to the control device 3, which displays it on the display 2. Thus, the latter can display an image representing, at the relevant instant, the field of view of the pilot with symbols, representative of said neighboring aircraft and disposed, in said image of the field of view, at the respective positions occupied by said neighboring aircraft in the actual field of view of the pilot, that is to say such as they are seen by said pilot of the seeker aircraft through the canopy of the cockpit.

Figure 2:
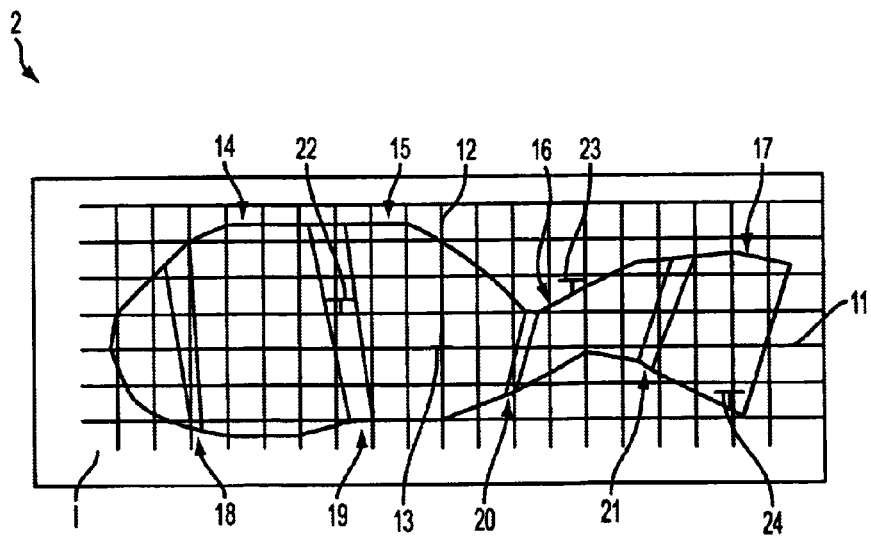
FIG. 2 shows, on a larger scale, the screen of the display device of the device of FIG. 1.

Represented in FIG. 2, it is an exemplary image I appearing on said display 2. This image I is referred to a system of rectangular axes, for example graduated in degrees of angle, comprising a horizontal axis 11 and a vertical axis 12, whose intersection 13 (origin of said system of axes) symbolizes the position of the seeker aircraft on board which the device 1 is mounted.

The image I comprises the image of the canopy of the seeker aircraft, such as it appears in the field of view of the pilot, together with, for example, the images 14 to 17, respectively, of the pilot's side window, of the pilot's front window, of the copilot's front window and the copilot's side window 17, as well as together with the images 18 to 21 of the uprights of the canopy separating said windows. The image I comprises, moreover, symbols 22, 23 and 24, representative of three neighboring aircraft, the positions of said symbols 22, 23 and 24 in the system of axes 11, 12 corresponding respectively to the positions of said neighboring aircraft in the field of view of the pilot, through the canopy.

Each of said symbols 22, 23, 24 associated with neighboring aircraft may be:
representative of the nature of the corresponding neighboring aircraft and be different depending on whether this aircraft is an airplane, a helicopter, a balloon, etc;
representative of the make, of the type and/or of the version of said neighboring aircraft, possibly with indication of the degree of turbulence to which it gives rise;
representative of the relative distance between the neighboring aircraft concerned and the aircraft on board which the device 1 is situated. For example, the size of a symbol 22, 23, 24 may vary inversely with this distance, although being constant in certain distance intervals, said size varying when said distance passes from one interval to another;
representative of the attitude of the neighboring aircraft, this symbol possibly being different depending on whether the latter is approaching or receding, climbing or descending, moving to the left or to the right, etc; and
associated with written information, representative for example of the flight number of the neighboring aircraft concerned and of the airline to which it belongs. However, so as not to overburden the display 2, this written information is displayed only for those neighboring aircraft which comply with a particular criterion, such as, for example, a distance or an altitude less than a predetermined threshold.

Also, so as not to overburden the display 2, the device 1 can comprise a filtering device (not represented) eliminating from the display any neighboring aircraft whose distance or altitude is greater than a predetermined threshold.

The display 2 can be specifically envisaged for the device 1. However, it may also belong to another system of the aircraft, for example the ND device mentioned hereinabove. In the latter case, it is necessary to envisage a voluntary action on the part of the pilot or of one of the outside devices 8, 9 so as to separate the display from this other system and associate it with the device 1, so that it can display the elements 11 to 24. A voluntary action such as this may be performed by way of a device of the switch type, either directly, or by way of the MCDU console (Multipurpose Control and Display Unit) generally provided on board civil transport airplanes. The displaying of the elements 11 to 24 resulting therefrom may then be permanent or temporary, over a sufficient duration for the pilot to spot the sought neighboring aircraft that he must track. This spotting operation may moreover be made easier by the fact that the symbol 22 to 24, tied to this sought aircraft, may be rendered very distinctive, for example by flashing, highlighting, etc., by virtue of special instructions received from one or other of the outside devices 8, 9 by way of the communication means 6, 7.

The communication means 6 are, for example, intended for the link between the device 1 and an air traffic control installation 8. Such a link may be analog or digital. It allows the air traffic control installation 8 to ask the pilot to identify and to track a sought aircraft. Preferably, it also allows the pilot of the seeker aircraft to address an acknowledgement message to the air traffic control installation 8 to signify to the latter that he has indeed identified this sought aircraft.

This sought aircraft may, in a known manner, be equipped with a transponder of so-called TIS/B type, allowing it to address information relating to its altitude, its transponder number, etc. to the air traffic control installation on the ground 8. This information, or at the very least that part of it which is most relevant, supplemented with position information computed by a ground radar, may be returned by the air traffic control installation 8 to the aircraft situated in the area of coverage. When the seeker aircraft equipped with the device 1 is in this area of coverage, it may thus receive, by way of the communication means 6, information regarding all the aircraft equipped with a TIS/B transponder flying within said area of coverage.

Moreover, it is known that certain aircraft 9 are equipped with a so-called ADS/B (Automatic Dependent Surveillance—Broadcast) transmitter broadcasting information relating to their position, their speed, their identification, etc. to the air traffic control installation 8, as well as to the other airplanes.

Thus, the seeker airplane carrying the device 1 can receive directly from such an aircraft 9, by way of the communication means 7, the information transmitted by its ADS/B transmitter.

It is of course advantageous for the device 1 to receive, via the communication means 6, information of TIS/B type and, via the communication means 7, information of ADS/B type.

What is claimed is:

1. In a first aircraft having a cockpit with a canopy, a device for aiding the visual spotting of a second aircraft in flight by the pilot of the first aircraft looking at the sky through the canopy, the device comprising:

an approximately vertical display device;

a first means for displaying on the display device a representation of the canopy;

a communication means for receiving position information relating to the second aircraft from an outside source; and a second means for displaying on the display device, using the received position information, a symbol representative of the second aircraft such that the position of the symbol in relation to the displayed representation of the canopy corresponds to the position of the second aircraft in relation to the aircraft's canopy as seen through the pilot's field of view, wherein:

a horizontal axis and a vertical axis, whose intersection is representative of the position of the first aircraft on the display device, are also displayed on the display device.

2. The device of claim 1, wherein:

the first means comprises a first memory that stores information representing the fixed elements of the first aircraft's cockpit that are present in the field of view of the pilot;

the second means comprises a second memory that stores the position information; and said first and second means comprise, in common, a computing unit that combines information received from said first and second memories so as to display the symbol and the representation of the canopy on the display device.

3. The device of claim 1, wherein the communication means links the device to an air traffic control installation.

4. The device of claim 3, wherein the communication means transmits a message from the pilot to the air traffic control installation.

5. The device of claim 1, wherein the communication means links the device to the second aircraft.

* * * * *